Patented Aug. 14, 1945

2,382,283

UNITED STATES PATENT OFFICE 2,382,283

THERMOSTATIC MIXER

Harry Barnett, Glencoe, Ill., assignor to The Powers Regulator Company, Chicago, Ill., a corporation of Illinois Application July 2, 1942, Serial No. 449,439

9 Claims. (Cl. 236—12)

This invention relates to mixers for hot and cold fluids and particularly to a mixer of the solid charged type, that is, one in which the thermostatic action is secured by expansion and contraction of the body of liquid confined within the thermostatic element.

It is an object of this invention to provide a solid fill thermostatic mixer in which quick action is secured following an increase in temperature of the mixed liquids, this result being attained by employing means such as a dash pot whereby the effective area of the compressible element is varied.

Inasmuch as the degree of movement of a valve operating element is a quotient of the volumetric change divided by the area of the compressible element, it is important that the area be as small as possible if adequate movement is to be secured. However, in such a design, if quick action is to be obtained, more movement will be secured than is necessary, and I have made provision for changing the said effective area by a gradual leak of the thermostatic liquid into a space which I call a dash pot, as the result of which the effective area is increased and the movable part retracts, while keeping the hot inlet closed, even though the temperature effective on the thermostatic element remains unchanged. In the arrangement disclosed, this desirable action following a sudden increase in temperature of the fluid may have the result of slowing down the response of the instrument to a lowering of the temperature of the mixed liquids, but this is not objectionable, since no danger to a user will result in failure to immediately correct such a temperature change.

If the thermostatic motor were designed to invariably give more than the movement required to close the hot inlet, it would be much larger in size and the operating range would be correspondingly less.

Another object is to provide for positive movement of the mixing valve in both directions, both by thermostatic and manual action as distinguished from constructions in which movement in one direction is effected by spring action. This has the advantage that in the event of a tendency of the valve to stick, such tendency is resisted and substantially prevented. However, as an incident to such a positive connection, means is provided which enables the separation of the valve and operating parts, if it becomes desirable to dismantle the structure in order to inspect or repair a valve.

Still another object is to provide a construction in which the adjusting and operating handle rotates in a plane, that is, its position relative to the face plate remains constant notwithstanding the movement of its stem by screw action following its rotation.

Yet another object is to provide a construction in which the entire thermostat and valve operating assembly may be removed as a unit from the casing.

A further object is to provide a combined check valve and strainer assembly formed as a unit and adapted to be inserted and removed as a unit.

With these and various other objects in view, the invention may consist of certain novel features of construction and operation as will be more fully described and particularly pointed out in the specification, drawings and claims appended hereto.

In the drawings, which illustrate an embodiment of the device, and wherein like reference characters are used to designate like parts—

Figure 2:
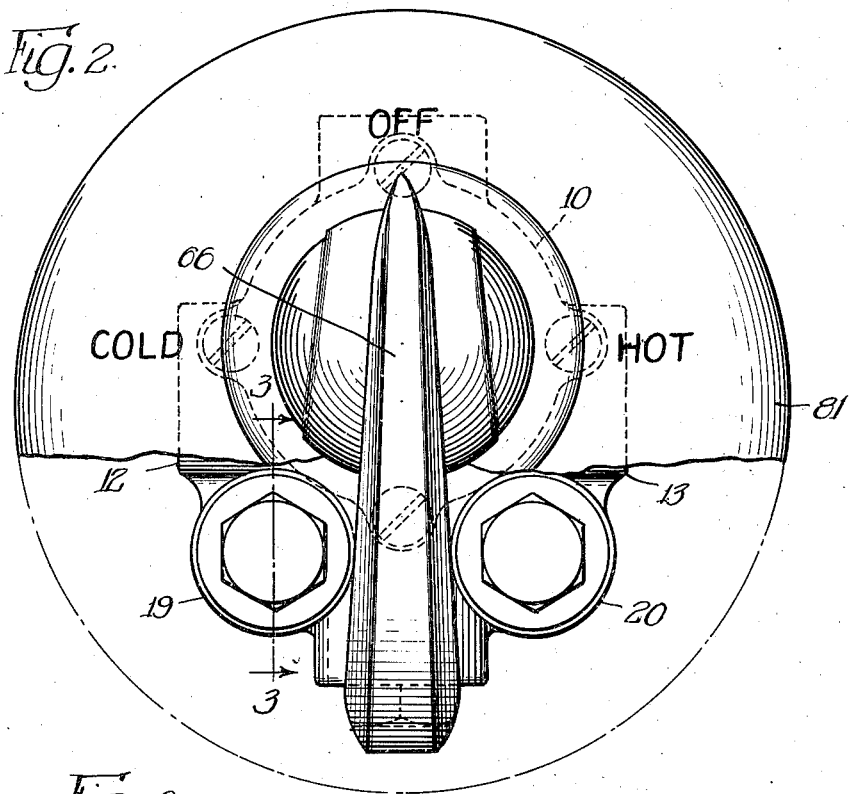
Figure 2 is an elevation looking toward the left of Figure 1 with the dial plate partly broken away.
Figure 3:
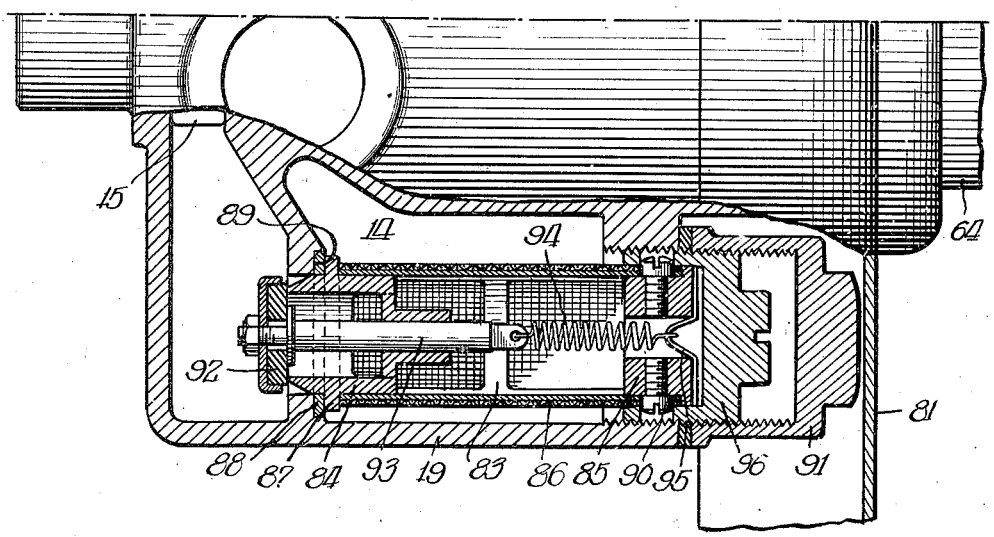

Figure 3 is a sectional elevation taken substantially in the plane as indicated by the line 3—3 of Figure 2; and, Fig. 4 is an enlarged fragmentary sectional elevation of the releasable head and core arrangement for the mixing valve, the full lines showing the operating stem of the head released from the spring finger connection and the dotted line position of the stem indicating its normal connected position.

*The casing.*—The casing may be formed as a casting and comprises a cylindrical barrel 10 having an internal space 11. It is provided with a hot water inlet 12 and a cold water inlet 13. The designations "cold" and "hot" appearing in Figure 2 are on the face plate and are not intended as designations of the inlets into the casing. A passage 14 shown in Figure 3 serves to convey the liquid past the check valve into the space 15 at the back end of the casing at the axial center of the casing, while a passage (not shown) from the cold water inlet extends through a duplicate check valve and into the annular space 16 in alignment with the space 15 and separated therefrom. The casing is provided with two outlet openings 17 and 18 which may be used selectively, one of them being plugged, as shown in Figure 1, if the other is to be used, these outlets being open to the space 11.

The casing provides two integral shells 19 and 20 adapted to receive the check valve and strainer units, one of which is shown in Figure 3.

*The bonnet.*—The bonnet comprises a plate 21 held against the otherwise open end of the barrel 10 by screws 22, a washer serving to prevent the escape of liquid. The plate has an axial threaded opening 23 and is provided with an axial hub 24 internally threaded for engagement by a gland nut 25 and recessed to receive packing 26.

Figure 1:
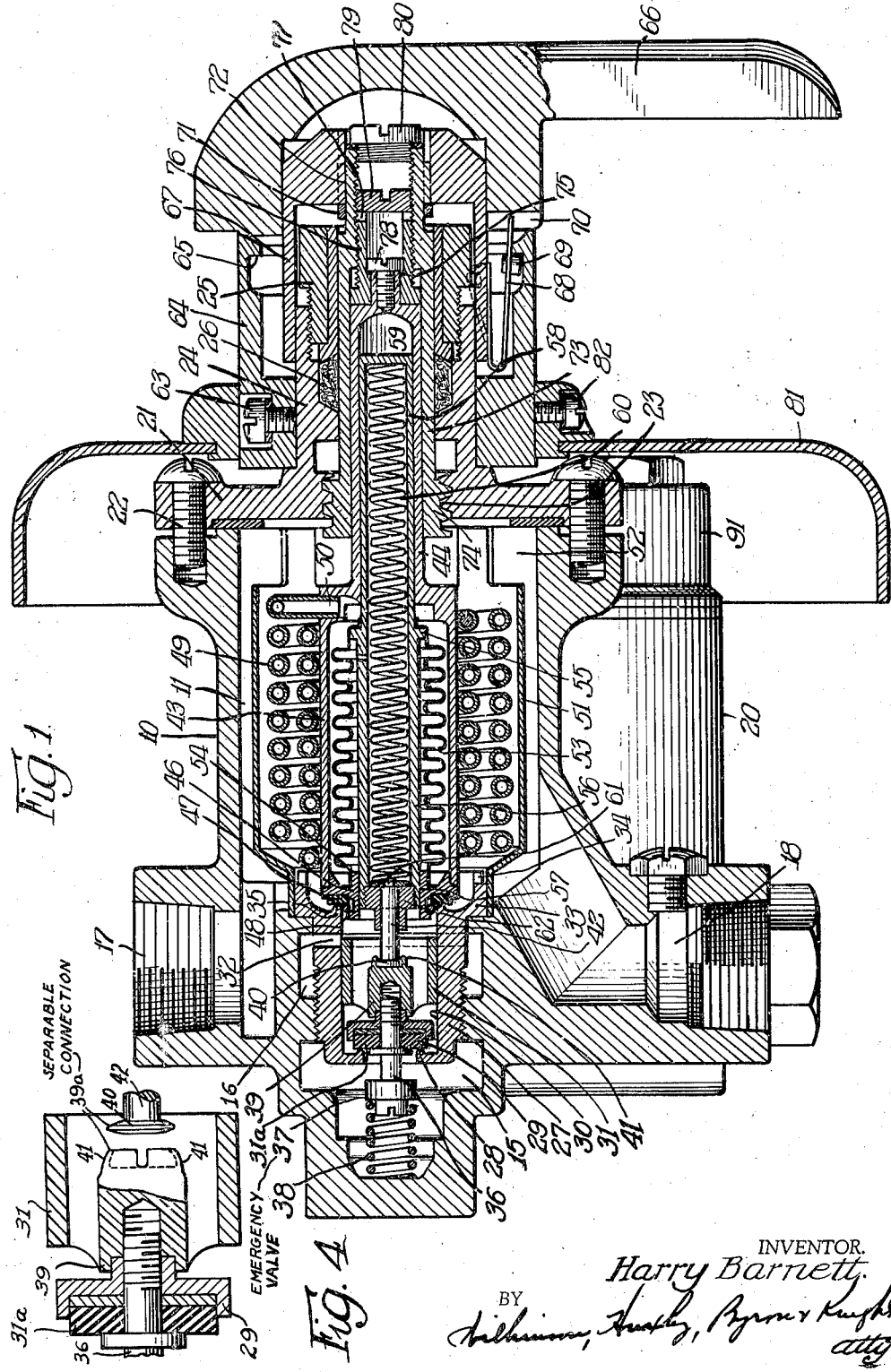
Figure 1 is a longitudinal sectional view through a mixer constructed in accordance with my invention.

*The mixing valve.*—The mixing valve, best shown in Figure 1, cooperates with a cylindrical seat member 27 threaded into an opening in the casing and acting to control the hot and cold passages 15 and 16. The seat member provides a circular valve seat 28 for a poppet or hot water valve 29 and a cylindrical surface 30 for engagement by a slide or cold water valve 31. The forward edge of the slide valve acts to throttle the circular port 32 for the cold water, the port being formed in the seat member 27. The forward portion of the seat member 27 provides a head 33 having spanner notches 34 and providing also a seat 35 for a shut-off valve.

The hot water valve 29 as described, comprises the two valve members 31a and 31, the valve 29 being carried on a stem 36 fastened into the center of the slide valve 31 and extending rearwardly where it is provided with a piston or valve 37 forming a seat for a compression spring 38. The assembly thus formed of valves 29 and 31 constitutes a so-called mixing valve. The core 39 of the slide valve provides at its axis and on the side opposite to the valve 29 a snap connection 39a in the form of spring ears 41 for engagement by the head 40 of an operating stem 42. The head of the stem may be snapped into place during assembly and will serve to move the mixing valve positively in both directions, although it may be disengaged (as shown in Fig. 4) in the event that the valve should become stuck beyond the ability of the thermostatic motor (or thermostat to be later described) and the return spring 38 to operate it. In that case the thermostatic motor can still be removed by additional pull which disengages stem 42 from the ears 41.

*The thermostat.*—The thermostat or thermostatic motor comprises a cylinder 43 having a long hollow, cylindrical extension 44 at one end. At its opposite end the cylinder is closed by a head 46 which is soldered in place. This head carries a valve washer 47 forming the shut off valve, said washer being held in place by a split ring 48, the washer bearing against the seat 35.

Helically wound around the cylinder 43 is a double coil 49, the outer end of the coil being sealed after the thermostatic liquid has been placed therein, while the inner end 50 is soldered into the wall of the cylinder 43 and is open to the space within the cylinder. Suitable thermostatic liquid is used such as ethyl ether, toluol, toluene or ethyl alcohol, or the like. A thin metal shell 51 having outlet notches 52 at its forward end overlies the coil and compels the water entering past the shut-off valve to travel over the coil in order to enter the space 11.

Within the cylinder 43 is mounted the bellows or Sylphon 53, the front or inner end of the bellows being soldered to the annular flange 54 on the head 46, while the outer end of the bellows is soldered to an annular rib 55 formed substantially midway of the length of a hollow piston. The forward end 56 of the piston slides freely within the axial opening 57 in the head 46 while the opposite end 58 of the piston slides within the hollow extension 44 of the cylinder. The fitting of the end or piston 58 within the extension 44 will be somewhat loose, permitting but restricting the flow of thermostatic liquid from the space within the cylinder 43 to the space 59 at the end of the piston 58. In the event the charge leaks from space 59, the hollow piston 56—58 moves all the way back, i. e. toward the right as viewed in Figure 1, which causes the cold water port 32 to be closed by the sleeve valve. The cold water port closes first, and continued movement of the piston 56—58 toward the right, causes the emergency shut-off valve 37 to seat on the portion of seat member 27 opposite to the seat 28, thus closing the hot water port.

Within the hollow piston 56—58 I provide a long compression (overload) spring 60 bearing against the head 61 of the stem 42, this head normally lying against the inner face of a threaded plug 62 seated in the otherwise open end of the piston 56. The stem slides freely through an opening in the axis of the plug. This construction is provided so that if the hot water valve 29 is closed and the handle is turned to move the shut-off valve 47 to closed position, the spring 60 will permit the closing movement of the thermostat assembly without further movement of the mixing valves.

*The operating handle assembly.*—Mounted on the hub 24 and held in place by means of a set screw 63 is a sleeve 64 having an internal annular groove providing a shoulder 65. The operating handle 66 has a hollow hub 67 which is guided on the hub 24 of the bonnet and carries a leaf spring 68 with a detent 69 thereon adapted to engage the abutment 65. An opening 70, in registry with the end of the leaf spring 68, provides for entering a tool in order to press upwardly on the spring and release the handle, whereupon it may be pulled directly outwardly from its position.

The hub 67 is provided with an axial opening having teeth which engage with corresponding teeth 71 formed on the surface of the outer end 72 of a hollow stem, the inner end of which carries screw threads 74 which engage with the threads 23 formed in the bonnet. The said hollow stem 73 receives the hollow extension 44 of the thermostat shell, with capacity for sliding and rotative movement thereon.

The extreme forward end of the hollow extension 44 carries a hollow, internally threaded, axial projection 75, and fitting over this projection is a sleeve 76 externally threaded to engage with corresponding threads on the interior of the hollow stem 73, the outer end of the threaded sleeve having spanner notches 77. A screw 78 engaging the internally threaded projection 75 holds the sleeve 76 against longitudinal movement relative to the thermostatic cylinder 44 but permits rotation relative thereto. The said threaded sleeve 76 is used for factory adjustment or calibration of the instrument, and when this has been accomplished a lock nut 79 in the form of a threaded disc is located as shown. Thereafter a plug 80 may be placed in the open, outer end of the hollow stem. It will be seen that as a result of the described arrangement the operating handle may be rotated to turn the stem for adjustment purposes, the stem moving longitudinally while the handle rotates in a fixed plane. A wall and dial plate 81 is held in place on the sleeve 64 by means of a set screw 82, it being adjustable to any desired position throughout the length of the said sleeve 64.

*Check valve and screen unit.*—These units, one of which is shown in sectional view in Figure 3, are contained within the tubular projections 19 and 20 of the casing, and in the case of the one shown in Figure 3, is interposed in the hot water passage 14. The unit comprises a cage 83 having annular end pieces or heads 84 and 85 at its two ends and being surrounded by a screen 86. At the rear end the plug 84 has a flange 87 that serves to support a washer 88 resting on a seat 89 formed on the casing. A water-tight closure is effected at this point by means of a threaded head 96 secured to the screen structure and the outer head 85 by means of screws 90, the nut engaging a threaded opening in a wall of the casing. As a closure and lock nut I provide the screw cap 91.

Seated on the outer end of the plug 84 is a check valve 92, the stem 93 of which is guided in an axial opening in the plug and is connected to a tension spring 94 anchored in the plug 85 on a separable wire clip 95. It will be noted that upon removal of the cap 91 the threaded nut 96 may be backed out, carrying with it the entire check valve and strainer assembly for cleaning or repairing without disturbing any of the operating parts of the mixer. In operation the water entering the passage 14 passes through the screen, thence into the hollow head 84, and, after unseating the valve 92, passes into the passage 15. Thus it will be seen that the water first must pass through the strainer before it reaches valve 29, preventing clogging of said valve as all foreign matter is removed by the strainer.

*Operation.*—In the mixer shown in Figure 1, the parts are shown in closed position. Upon rotating the handle counterclockwise as viewed in Figure 2 the shut-off valve 47 is opened admitting cold water through the port 32, and then the hot water valve 29 is slightly opened.

It will be understood that the movements contemplated are very small and no attempt has been made to show exact valve positions. As the mixed hot and cold liquids pass over and around the coils 49, the temperature is continuously determined and if at the specific setting of the handle the temperature rises above that determined by the setting, the thermostatic liquid will expand, thereby compressing the bellows and moving the piston toward the left as viewed in Figure 1, and with it the mixing valves. This will tend to close the hot water inlet valve and still further open the cold water port. Any such action occurs instantly, thereby exhausting the space 59 at the end of the piston because the action, at the time, is so quick the liquid does not have time to flow past the piston 58 to enter the space 59. However, ultimately the thermostatic liquid will slowly leak into the space 59 and balance the pressure. In the case of a sudden substantial increase in temperature, the response will be immediate, and there will be a contraction of the bellows out of proportion to the necessity for movement to close the hot water inlet. In that case the excess movement will be taken up by the spring 60, the piston 58 traveling farther than the stem 42. Upon leakage into the chamber 59, the piston will later return to a position in which it is able to resume control of the mixing valves.

While the compression spring 38 functions to move the mixing valves to the right as viewed in Figure 1, it merely supplements the positive movement of the valves through the snap connections of the stem 42 with the valves. In case there is a tendency for the slide valve to stick, that would not be overcome by the force of the spring 38, but the added force exerted by the pull on the stem will overcome such tendency. If the valve should actually freeze in place, then upon removal of the bonnet screws 22, the entire assembly may be withdrawn through breaking the snap connection 39a.

It will be noted that I have provided a relatively long hub 24 on the bonnet, and that any water leakage that may occur around the stuffing box will be discharged outside of the wall plate or dial.

An instrument constructed as heretofore described has been found to be highly efficient and accurate in operation, and is so constructed as to insure long continued use without deterioration of the operating parts.

In many of the claims reference is made to a "mixing valve." When the term is used, I comprehend any construction having the function of a mixing valve whether one or two valves are employed for the purpose.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a thermostatic mixer having a casing with hot and cold fluid inlets, a tempered liquid outlet and a mixing valve, the combination of a container for a thermostatic liquid located within the casing in the path of travel of the mixed liquids to the outlet, a rigid shell, said container being open to the shell, a bellows within the shell, the container and the space in the shell exterior to said bellows being filled with said thermostatic liquid whereby upon expansion of said liquid the bellows is compressed, a plunger connected to one end of the bellows and to the mixing valve, and means including a member movable with said bellows acting after a change in volume of the thermostatic liquid for varying the effective area of the bellows.

2. In a thermostatic mixer having a casing with hot and cold fluid inlets, a tempered liquid outlet and a mixing valve, the combination of a coil of tubing located in the path of travel of the tempered liquid to the outlet, a hollow cylinder in open communication with said tubing, a bellows within the cylinder, a plunger axially located relative to said cylinder and connected to the mixing valve, one end of the bellows being connected to the cylinder and the other end to the plunger, the tubing and the space within the cylinder exteriorly of the bellows being entirely filled with a thermostatic liquid whereby on expansion of the liquid the bellows will be compressed and the plunger will be moved a distance equal to the volumetric expansion divided by the effective area of the bellows, and means including a member movable with said bellows for gradually increasing the effective area of the bellows following an increase in the volume of the liquid.

3. In a thermostatic mixer having a casing with hot and cold fluid inlets, a tempered liquid outlet and a mixing valve, the combination of a coil of tubing located in the path of travel of the tempered liquid to the outlet, a non-expansible cylinder having an axial cylindrical extension open to said cylinder, a bellows within the cylinder, a plunger axially located in said cylinder and operatively connected to the mixing valve, one end of the plunger acting as a piston and entering said extension with clearance to permit bleeding of the thermostatic liquid into the space at the end of the piston, one end of the bellows being connected to the cyinder and the other end to the plunger, the space within the tubing and the cylinder exteriorly of the bellows being filled with a thermostatic liquid whereby on expansion of the liquid the bellows will be compressed and the plunger and mixing valve will be moved a distance equal to the volumetric expansion of the liquid divided by the effective area of the bellows, the clearance around said piston permitting the bleeding of liquid into space at the end of said piston and serving to gradually increase the effective area of the bellows and to proportionately permit retraction of the plunger.

4. In a thermostatic mixer having a casing with hot and cold fluid inlets, a tempered liquid outlet and a mixing valve, the combination of a coil of tubing located in the path of travel of the tempered liquid to the outlet, a non-expansible cylinder having an axial cylindrical extension open to said cylinder, a bellows within the cylinder, a plunger axially located in said cylinder and operatively connected to the mixing valve with capacity for spring resisted relative movement after the hot fluid port is closed, one end of the plunger acting as a piston and entering said extension with clearance to permit bleeding of the thermostatic liquid into the space at the end of the piston, one end of the bellows being connected to the cylinder and the other end to the plunger, the space within the tubing and the cylinder exteriorly of the bellows being filled with a thermostatic liquid whereby on expansion of the liquid the bellows will be compressed and the plunger and mixing valve will be moved a distance equal to the volumetric expansion of the liquid divided by the effective area of the bellows, the clearance around said piston permitting the bleeding of liquid into the space at the end of said piston and serving to gradually increase the effective area of the bellows and to proportionately retract the plunger.

5. In a thermostatic mixer having a casing with hot and cold fluid inlets, a tempered liquid outlet and a mixing valve, the combination of a coil of tubing located in the path of travel of the tempered liquid to the outlet, a hollow cylinder in open communication with said tubing, a bellows within the cylinder, a plunger axially located relative to said cylinder and connected to the mixing valve, one end of the bellows being connected to the cylinder and the other end to the plunger, the tubing and the space within the cylinder exteriorly of the bellows being entirely filled with a thermostatic liquid whereby on expansion of the liquid the bellows will be compressed and the plunger will be moved a distance equal to the volumetric expansion divided by the effective area of the bellows, and means providing a space, the volume capacity of which is varied in proportion to the movement of the plunger, said space being open to the space within the cylinder through a restricted passage, whereby the thermostatic liquid may bleed into and out of said space following a change in the volume of said liquid.

6. A mixing valve comprising a casing having hot and cold liquid inlets and a mixed liquid outlet, said casing having hot and cold liquid spaces communicating with the respective inlets, means providing hot and cold liquid valve seats and providing a chamber into which hot and cold liquid flows past said seats, mixing valve means cooperating with said seats for controlling flow past said seats, a valve seat in said chamber disposed between said first named chamber and another chamber, said last named chamber communicating with the outlet, a cylindrical member slidably mounted in said last named chamber and being provided with a valve for controlling said last named seat, a handle movable to control said last named valve, a hollow piston slidably mounted in said cylindrical member, a stem connected to said mixing valve means, and movable with and with respect to said hollow piston, resilient means in said hollow piston urging said mixing valve in a direction toward closing said hot liquid inlet, a bellows disposed in said cylindrical member having one end connected to said cylindrical member and the other end connected to said hollow piston whereby movement of said bellows causes relative movement between said cylindrical member and hollow piston, and a thermostatic member disposed in said last named chamber and communicating with said cylindrical member whereby operation of said thermostatic member causes operation of said bellows.

7. A mixing valve comprising a casing having hot and cold liquid inlets and a mixed liquid outlet, said casing having hot and cold liquid spaces communicating with the respective inlets, means providing hot and cold liquid valve seats and providing a chamber into which hot and cold liquid flows past said seats, mixing valve means cooperating with said seats for controlling flow past said seats, a valve seat in said chamber disposed between said first named chamber and another chamber, said last named chamber communicating with the outlet, a cylindrical member slidably mounted in said last named chamber and being provided with a valve for controlling said last named seat, a handle movable to control said last named valve, a hollow piston slidably mounted in said cylindrical member, a stem connected to said mixing valve means, and movable with and with respect to said hollow piston, resilient means in said hollow piston urging said mixing valve in a direction toward closing said hot liquid inlet, a bellows disposed in said cylindrical member having one end connected to said cylindrical member and the other end connected to said hollow piston whereby movement of said bellows causes relative movement between said cylindrical member and hollow piston, a thermostatic member disposed in said last named chamber and communicating with said cylindrical member whereby operation of said thermostatic member causes operation of said bellows, said hollow piston being loosely mounted in said cylindrical member whereby slow leakage of thermostatic fluid may occur around said hollow piston.

8. A mixing valve comprising a casing having hot and cold liquid inlets and a mixed liquid outlet, said casing having hot and cold liquid spaces communicating with the respective inlets, means providing hot and cold liquid valve seats and providing a chamber into which hot and cold liquid flows past said seats, mixing valve means cooperating with said seats for controlling flow past said seats, a valve seat in said chamber disposed between said first named chamber and another chamber, said last named chamber communicating with the outlet, a cylindrical member slidably mounted in said last named chamber and being provided with a valve for controlling said last named seat, a handle movable to control said last named valve, a hollow piston slidably mounted in said cylindrical member, a stem connected to said mixing valve means, and movable with and with respect to said hollow piston, resilient means in said hollow piston urging said mixing valve in a direction toward closing said hot liquid inlet, a bellows disposed in said cylindrical member having one end connected to said cylindrical member and the other end connected to said hollow piston whereby movement of said bellows causes relative movement between said cylindrical member and hollow piston, a thermostatic member disposed in said last named chamber and communicating with said cylindrical member whereby operation of said thermostatic member causes operation of said bellows, said mixing valve being provided with a member for closing said hot liquid valve seat should the thermostatic member fail to respond to hold liquid.

9. In a thermostatic mixer having a casing with hot and cold fluid inlets, a tempered liquid outlet and a mixing valve, the combination of tubing located in the path of travel of the tempered liquid to the outlet, a non-expansible cylinder having an axial cylindrical extension open to said cylinder, a bellows within the cylinder, a plunger axially located in said cylinder and operatively connected to the mixing valve, one end of the plunger acting as a piston and entering said extension with clearance to permit bleeding of the thermostatic liquid into the space at the end of the piston, one end of the bellows being connected to the cylinder and the other end to the plunger, the space within the tubing and the cylinder exteriorly of the bellows being filled with a thermostatic liquid whereby on expansion of the liquid the bellows will be compressed and the plunger and mixing valve will be moved, the clearance around said piston permitting the bleeding of liquid into space at the end of said piston and serving to gradually increase the effective area of the bellows to permit retraction of the plunger.

HARRY BARNETT.